United States Patent [19]

de Putter

[11] 4,214,612

[45] Jul. 29, 1980

[54] TUBE OF NON WOVEN MATERIAL FOR REVERSED OSMOSIS

[75] Inventor: Warren J. de Putter, Hardenberg, Netherlands

[73] Assignee: Wavin B.V., Zwolle, Netherlands

[21] Appl. No.: 637,289

[22] Filed: Dec. 3, 1975

Related U.S. Application Data

[63] Continuation-in-part of Ser. No. 410,298, Oct. 29, 1973, abandoned.

[51] Int. Cl.² ............................................. F16L 9/16
[52] U.S. Cl. .................................... 138/144; 138/150; 138/154; 138/129; 138/137; 210/23 H; 210/500 M; 210/321 R; 156/73.2
[58] Field of Search ............... 138/122, 144, 153, 154, 138/172, 150, 129, 137; 29/470.3; 156/73; 210/321, 23, 490, 500 M

[56] References Cited

U.S. PATENT DOCUMENTS

| | | | |
|---|---|---|---|
| 3,002,534 | 10/1961 | Noland | 138/141 |
| 3,312,250 | 4/1967 | Sirignano et al. | 138/128 |
| 3,341,024 | 9/1967 | Lowe et al. | 210/490 |
| 3,457,170 | 7/1969 | Havens | 210/23 |
| 3,575,752 | 4/1971 | Carpenter | 156/73 |
| 3,676,193 | 7/1972 | Cooper et al. | 117/94 |

*Primary Examiner*—Richard E. Aegerter
*Assistant Examiner*—James E. Bryant, III
*Attorney, Agent, or Firm*—Edmund M. Jaskiewicz

[57] ABSTRACT

A composite tubular assembly comprising a membrane for membrane filtration fixed to the inner side of a tube of non woven material, consisting of a wound band of a sealable fibres containing non woven material, which may be helically or non helically wound, consecutive overlapping windings of the band being completely interconnected by ultrasonic heatsealing and thereby forming a smooth inner wall of the tube.

4 Claims, 4 Drawing Figures

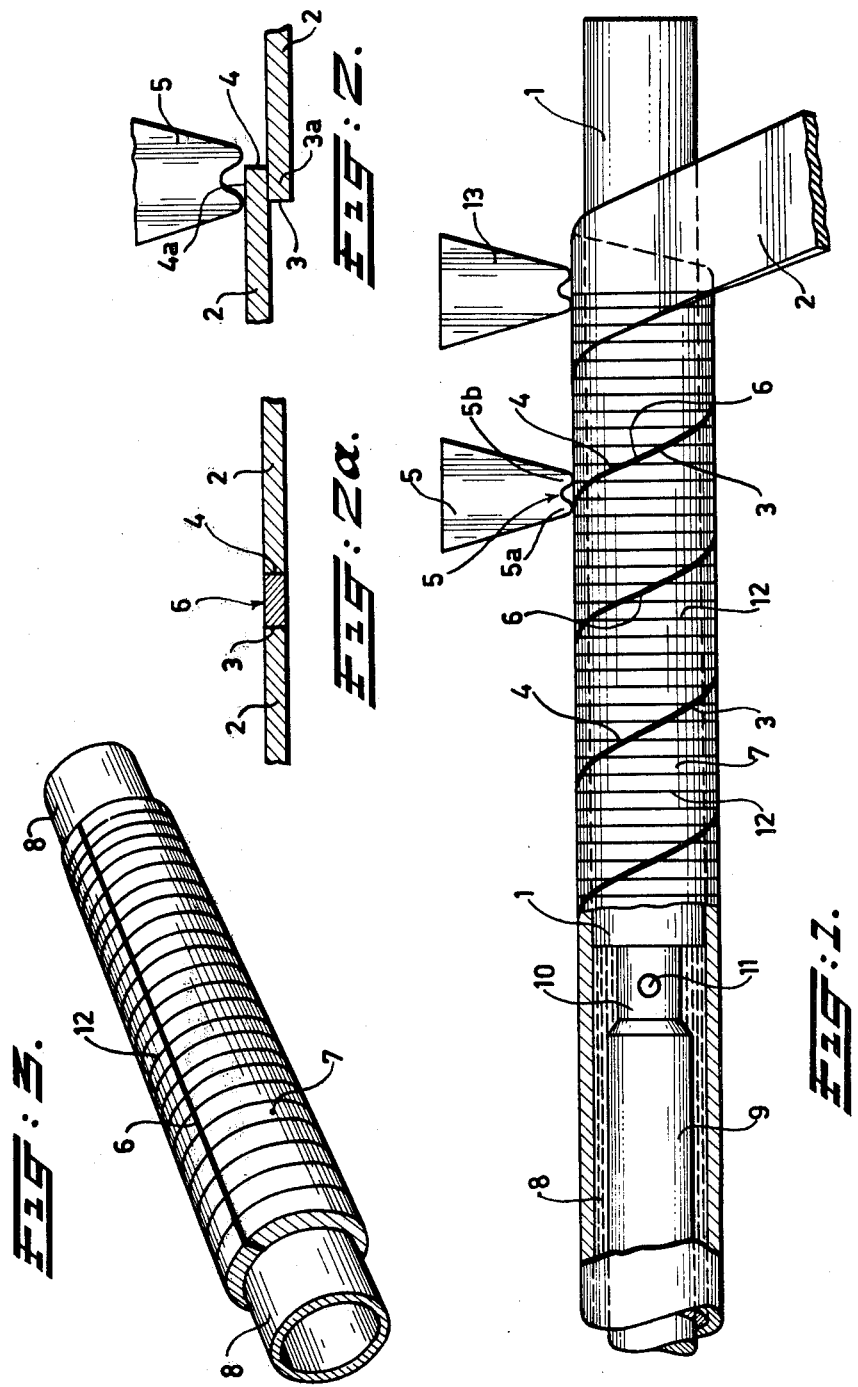

TUBE OF NON WOVEN MATERIAL FOR REVERSED OSMOSIS

This application is a continuation in part application of my prior application 410,298 filed Oct. 29, 1973 now abandoned.

BACKGROUND OF THE INVENTION

My invention relates to tubes of non woven material provided with supporting membranes for membrane filtration on its inner wall, said tube consisting of a band of a sealable synthetic fibres containing non woven material which is wound in a helical or non helical way, consecutive windings of the band being interconnected by heatsealing. By "membrane filtration" is meant e.g. ultrafiltration and reversed osmosis.

Such tubes of non woven material in which is disposed a tubular membrane for purifying liquids e.g. by means of reversed osmosis, are known in the art. They are e.g. manufactured by helically winding and with an overlap, a polyester non woven on a mandril, while between the overlapping parts of the band a polyethylene glue is applied which is heated to a temperature ranging from 110° to 150° C., whereupon the further sealing is effected by means of a heated shoe.

Due to the presence of the overlaps it is observed that within the tube sharp and/or fibrous edges are found whereby when e.g. a membrane suitable for reversed osmosis is directly applied to the non woven these edges show themselves in the membrane and give rise to weakenings in the membrane. Moreover there is a risk of projecting fibre ends of the non woven protruding through the membrane.

In order to obviate these difficulties it is known in the art to wind along a paper sheet on the inside of the non woven tube during the winding operation. In this way the aforementioned drawbacks of the application of tubes of non woven material obtained by winding a non woven of thermoplastic fibres in an overlapping way, are eliminated, but paper suffers from the disadvantage that, when softened in water, in the long run the coherence gets lost for the greater part, while the slimy mass thus produced, when the material is confined in a narrow space and when a pressure is exerted, offers a considerable resistance to the passage of water. Especially this unnecessary resistance to the passage of water should be avoided since it gives rise to waste of energy.

SUMMARY OF THE INVENTION

My invention aims to provide a tube of non woven material which does not suffer from the aforementioned disadvantages and without the inner non woven of paper fibres, while a membrane for membrane filtration can be directly applied to the inner side of a non woven tube, so that after the membrane for reversed osmosis is uneffective the non woven tube with the membrane for reversed osmosis affixed thereto can be removed from a supporting tube and discarded.

This aim is achieved in that a tube of non woven material is provided, having fixed on the inner wall thereof a membrane for mebrane filtration, said tube comprising a helically of non helically wound non woven band of heat-sealable synthetic fibres with edges thereof positioned in overlapping relationship and providing overlapping portions in the inside of the tube, said overlapping portions being uniformally heated on their entire thickness and width by ultrasonic sealing vibrations, so as to completely heat-seal the overlapping parts and along their edges to avoid the formation of sharp and fibrous portions within the inner side of the tube and to obtain a very uniform inner diameter whereby risk of damage of said membrane within the tube is minimized and the tube is provided with a membrane on its innerside.

Due to the application of an ultrasonic sealing operation a very good sealed joint is obtained since the overlapping non woven masses are uniformly heated on their entire thickness and melt together thereby. The very strong non woven tube, thus obtained, has the same diameter on its inside overywhere when the overlapping parts are fully sealed together, while at the connections between consecutive windings no projecting fibre ends protrude from the non woven tube. Hence there is no risk of damage to a membrane for membrane filtration, when it is disposed in such a non woven tube.

Another important advantage is that the surface of the non woven tube is permeable to water and can be optimally utilized, since only narrow sealed joints are formed, which are impermeable to water, along the area just between the edges of two consecutive windings which are interconnected with an overlap.

An important advantage is moreover that no paper inner tube need be used, so that there is no risk of a slimy mass on the inside of the non woven tube whereby the resistance to the passage of water will be enhanced. It has been found that with tubes of non woven material according to the invention the resistance to the passage of water is much smaller.

On the other hand the greater rigidity of the non woven tube obtained in this way offers the possibility, after the membrane is ineffective, to discard the assembly of non woven tube with the membrane disposed therein. The rigidity is increased in view of the ultrasonic sealing.

In order to enhance the strength properties of the tube, the same is externally wound with one or more reinforcing threads or bands which are conveniently at least partially sealed to the non woven tube. It is obvious that for such reinforcing threads or -bands very thin threads or bands should be chosen, so as to avoid undesired deformations in the membrane on disposing such a tube in a supporting tube.

Reinforcing threads or bands consist efficiently of thermoplastic material which can be sealed to the non woven band used for the formation of the tube of non woven material while previously a greater strength has been imparted to the reinforcing threads or bands by stretching.

The reinforcing threads consist preferably of glass threads which by means of a glue, melting in the presence of heat, are connected to the non woven. The reinforcing threads extend efficiently in a direction perpendicular to the longitudinal axis of the non woven tube. When a glue melting in the presence of heat is applied, adhering e.g. to a polyester non woven, fastening can be easily effected by applying lines of the glue on the outer side of the non woven tube.

SURVEY OF THE DRAWINGS

FIG. 1 shows diagrammatically the construction of a tube of non woven material in which a membrane is disposed for reversed osmosis;

FIG. 2 is a detail showing consecutive overlapping windings of a non woven tube, to be connected by means of an ultrasonic sealing operation;

FIG. 2a is a cross section of a non woven tube obtained by ultrasonic sealing;

FIG. 3 is a view of a non woven tube with a longitudinal seal which is provided with reinforcing threads.

DESCRIPTION OF PREFERRED EMBODIMENTS

FIG. 1 shows a mandril on which a band 2 consisting of a non woven of theremoplastic fibres, such as a polyester non woven, is wound such that the windings overlap each other. The adjacent edges of two consecutive overlapping windings of the band 2 are indicated by 3 and 4. Thereupon by means of a horn 5 for ultrasonic sealing vibrations are produced in the non woven material so that due to the heat generated hereby, the overlapping parts between the edges 3 and 4 and the edges are plasticized, whereby the fibres are sealed to each other while forming a sealed joint 6. As the overlapping parts between edges 3 and 4 and the edges 3 and 4 are plasticized the tube will have a rather smooth inner side in the originally overlapping area without extending fibrous ends which may damage a membrane to be fixed to this wall. Moreover, in this way the non woven tube will have a substantially uniform diameter which also prevents damage of the membrane to be fixed to the inner side of the non woven tube.

Besides the very uniform inner diameter also a very strong sealed joint is obtained, while the outer diameter, too, is substantially constant.

Instead of overlapping of the band 2 in a helical way it is also possible to overlap only in the longitudinal sense thereby forming a longitudinal seal 6a.

The sealed joint has in practice a width ranging from 0.5 to 1 mm, while the overlap mostly ranges from 0.2 to 0.3 mm. These values imply, however, no limitation whatsoever. The starting non woven is preferably resilient in the direction of the width and is at least 0.15 mm thick.

The ultrasonic sealing provides a smooth inner wall of the non woven tube so that the risk of damage to a membrane in such a tube is minimized. This is important as the membrane is subjected to a high pressure.

For the formation of the sealed joint 6 a horn 5 is used which presses perpendicularly by means of its parts 5a and 5b on either side of the overlapping winding portions 3a, 4a of the band 2, while the sealing is effected by means of ultrasonically produced vibrations. A spirally extending sealed joint 6 formed by means of an ultrasonic sealing process will impart also an extraordinary rigidity to the tube, which allows to pull the composite tubular assembly of non woven tube with a substantially constant inner diameter and a membrane 8 disposed therein for reversed osmosis, from a supporting tube disposed around the non woven tube 7 and to discard the whole when the membrane is no longer effective. It has been found that in such an assembly of non woven tube 7 and membrane 8 for reversed osmosis disposed therein, the latter mostly in the shape of a cellulose acetate membrane, a noticeable lesser resistance to the passage of water is met with than in non woven tubes carrying on the inside between the membrane 8 and the non woven tube 7, another tube wound from cellulose fibres.

In order to dispose a membrane in the non woven tube provisions known per se can be made, e.g. in the shape of a thickening 9 which at a slight clearance is concentrically arranged within the non woven tube 7. On the side 10, turned from the direction of transmission, of the thickening is an outflow opening 11 through which the membrane forming liquid can be introduced into the tube. When the non woven tube 7 is moved past the thickening, the membrane forms on the inside of the thickening.

In order to reinforce the non woven tube the outer side of the tube can be wound with e.g. reinforced polyester threads 12 which by means of a second horn 13 for ultrasonic sealing are connected with the outside of the non woven. It is advisable to choose reinforcing threads which are as thin as possible, in order to avoid that in the disposed membrane deformations, owing to those reinforcing threads would show.

It is obvious that the reinforcing threads 12 can be connected with the outside of the non woven tube without sealing them, or by only locally sealing them together with the tube. The reinforcing threads are then for instance exclusively connected with the non woven tubes at the location of the sealed joints to be formed.

It is advisable to use glass threads such as reinforcing threads 12 which by means of a glue fusible under the influence of heat, are connected with the non woven tube.

The reinforcing threads extend in general perpendicular to the longitudinal axis of the non woven tube.

The glue used for connection of reinforcing threads which cannot be sealed to the fibres of the non woven, like glass fibres, is mostly applied as lines extending in the longitudinal direction on the outside of the non woven tube.

What I claim is:

1. A tube of non-woven material, having fixed on the inner wall thereof a membrane for membrane filtration, said tube comprising a helically wound non-woven band of heat-sealable synthetic fibres with edges thereof positioned in overlapping relationship and providing overlapping portions in the inside of the tube, said overlapping portions being uniformally heated on their entire thickness and width by ultrasonic sealing vibrations, so as to completely heat-seal the overlapping parts and along their edges to avoid the formation of sharp and fibrous portions of extending fibrous ends within the inner side of the tube so that a smooth inner wall is obtained and to obtain a very uniform inner diameter whereby risk of damage of said membrane within the tube is minimized and the tube is provided with a membrane on its innerside.

2. A tube as claimed in claim 1, wherein said band is resilient in the direction along its width.

3. Tube according to claim 1, wherein the outer side of the tube is wound with reinforcing threads which extend substantially perpendicularly to the longitudinal axis of the non-woven tube.

4. Tube according to claim 1, wherein the reinforcing threads are at least partially sealed to the non woven fibers.

* * * * *